(12) United States Patent
Rogers et al.

(10) Patent No.: US 10,753,817 B2
(45) Date of Patent: Aug. 25, 2020

(54) TESTING APPARATUS, COMPUTER READABLE MEDIUM, AND METHOD FOR MINIMIZING RUNOUT

(71) Applicant: Yaskawa America, Inc., Waukegan, IL (US)

(72) Inventors: John Charles Rogers, Danville, CA (US); Clark Thomas Tella, San Francisco, CA (US)

(73) Assignee: YASKAWA AMERICA, INC., Waukegan, IL (US)

( * ) Notice: Subject to any disclaimer, the term of this patent is extended or adjusted under 35 U.S.C. 154(b) by 302 days.

(21) Appl. No.: 15/908,902

(22) Filed: Mar. 1, 2018

(65) Prior Publication Data
US 2018/0252608 A1    Sep. 6, 2018

Related U.S. Application Data

(60) Provisional application No. 62/467,463, filed on Mar. 6, 2017.

(51) Int. Cl.
*G01M 1/36* (2006.01)
*G01M 1/16* (2006.01)
*G01M 1/08* (2006.01)

(52) U.S. Cl.
CPC ............... *G01M 1/16* (2013.01); *G01M 1/08* (2013.01); *G01M 1/36* (2013.01)

(58) Field of Classification Search
CPC ............ G01M 1/16; G01M 1/36; G01M 1/08; G01M 1/24; G01M 1/30; G01M 1/32

USPC .......... 29/407.05, 407.09, 407.1; 73/468, 66, 73/458, 487, 865.9; 33/1 BB, 1 SP, 286, 33/550; 356/625, 627–629, 635
See application file for complete search history.

(56) References Cited

U.S. PATENT DOCUMENTS

| | | | | |
|---|---|---|---|---|
| 3,177,738 A | * | 4/1965 | Achilles ................. | F16F 15/36 74/571.11 |
| 2012/0278996 A1 | * | 11/2012 | Park ........................ | D06F 33/02 8/137 |

FOREIGN PATENT DOCUMENTS

JP          2013226630       * 11/2013

* cited by examiner

*Primary Examiner* — Robert R Raevis
(74) *Attorney, Agent, or Firm* — Mori & Ward, LLP

(57) ABSTRACT

A testing apparatus for minimizing runout of a rotating assembly includes a measurement device and a runout evaluator. The measurement device measures a distance to a surface. The runout evaluator obtains a first runout of a surface of a first member of the rotating assembly from the measurement device. The first runout has a magnitude and a phase. The runout evaluator obtains a second runout of a surface of a second member of the rotating assembly from the measurement device. The second runout has a magnitude and a phase. The runout evaluator determines a rotational position of the first member relative to the second member which results in a reduced runout of the rotating assembly. The determination of the rotational position is based on the magnitude and the phase of the first runout and the magnitude and the phase of the second runout.

31 Claims, 10 Drawing Sheets

S1

S2

S3

TESTING APPARATUS, COMPUTER READABLE MEDIUM, AND METHOD FOR MINIMIZING RUNOUT

CROSS-REFERENCE TO RELATED APPLICATION

The present application claims priority under 35 U.S.C. § 119 to U.S. provisional Application No. 62/467,463, filed on Mar. 6, 2017, the entire contents of which are herein incorporated by reference.

BACKGROUND OF THE INVENTION

Field of the Invention

The present invention relates to a testing apparatus, computer readable medium, and method for minimizing runout.

Discussion of the Background

Axial runout is the result of angular misalignment between at least two mating surfaces. Many trainers, practitioners, and commentators agree that misalignment and problems related to misalignment are a principal cause of problems in rotating machinery. Thus, attention to alignment issues are an important part of a reliability program. However, published standards for alignment tolerances in rotating shafts are not readily available.

Often flexible couplings are employed to compensate for misalignment, with the misconception that the flexible couplings will accommodate misalignment without detriment to the other components in the rotating machine. Flexible couplings are often selected based upon the rated torque transmitted. However, numerous problems can influence the alignment of the final resulting rotating machine. Each individual part of a rotating mass can influence the final alignment, therefore each potential alignment problem with each individual part should be addressed. However, addressing alignment issues can involve time-consuming and expensive machining and diagnostic procedures. Even after such machining and diagnostics are performed, the result can be insufficient and lacking in endurance.

SUMMARY OF THE INVENTION

The present invention advantageously provides a testing apparatus for minimizing runout of a rotating assembly, including a measurement device configured to measure a distance to a surface, and a runout evaluator. The runout evaluator is configured to obtain a first runout of a surface of a first member of the rotating assembly from the measurement device, the first runout having a magnitude and a phase, and to obtain a second runout of a surface of a second member of the rotating assembly from the measurement device, the second runout having a magnitude and a phase. The runout evaluator is configured to determine a rotational position of the first member relative to the second member which results in a reduced runout of the rotating assembly based on the magnitude and the phase of the first runout and the magnitude and the phase of the second runout.

The present invention advantageously provides a testing apparatus for minimizing runout of a rotating assembly, including a measurement device configured to measure a distance to a surface, and circuitry. The circuitry is configured to obtain a first rollout of a surface of a first member of the rotating assembly from the measurement device, the first runout having a magnitude and a phase, and to obtain a second runout of a surface of a second member of the rotating assembly from the measurement device, the second runout having a magnitude and a phase. The circuitry is configured to determine a rotational position of the first member relative to the second member which results in a reduced runout of the rotating assembly based on the magnitude and the phase of the first runout and the magnitude and the phase of the second runout.

The present invention advantageously provides a computer readable medium storing instructions that, when executed by at least one processor, causes the at least one processor to carry out the steps of: obtaining a first runout of a surface of a first member of a rotating assembly, the first runout having a magnitude and a phase, obtaining a second runout of a surface of a second member of the rotating assembly, the second runout having a magnitude and a phase, and determining a rotational position of the first member relative to the second member which results in a reduced runout of the rotating assembly based on the magnitude and the phase of the first runout and the magnitude and the phase of the second runout.

The present invention advantageously provides a method for minimizing rollout of a rotating assembly, the method including obtaining a first runout of a surface of a first member of the rotating assembly, the first runout having a magnitude and a phase, and obtaining a second runout of a surface of a second member of the rotating assembly, the second runout having a magnitude and a phase. The method includes determining a rotational position of the first member relative to the second member which reduces the runout of the rotating assembly based on the magnitude and the phase of the first runout and the magnitude and the phase of the second runout.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
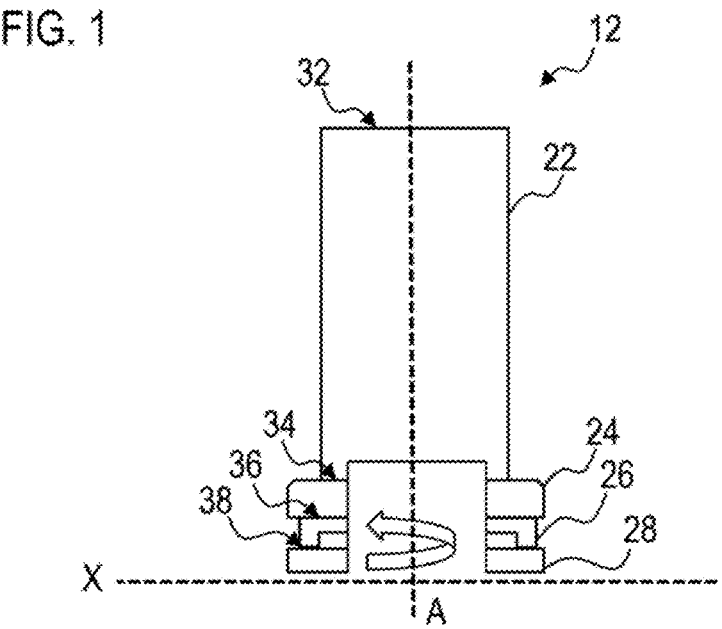
FIG. 1 is a cross-sectional view of a rotating shaft assembly according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 illustrates an exemplary rotor assembly 12 having four components 22, 24, 26, and 28. Each component 22, 24, 26, and 28 of rotor assembly 2 is disposed coaxially about rotational axis A. First component 22 is, for example, a shaft of the rotor assembly 12. Second, third, and fourth components 24, 26, and 28 are rigidly fixed to the first component 22 such that the entirety of rotor assembly 12 rotates as a unit about axis A. Each of the components 22, 24, 26, and 28 can be a shaft, coupling hub, impeller, joint, or other components rigidly fixed to collectively form rotor assembly 12.

Rotor assembly 12 includes a series of mating surfaces by which the components of the rotor interface with each other. A first mating surface 32 is disposed at an axial end of first component 22, providing an axial end surface for rotor assembly 12 as a whole when each of the components 22, 24, 26, and 28 are fixedly joined together. A second mating surface 34 is disposed at a surface of second component 24 that faces and mates with a corresponding surface of first component 22. Third mating surface 36 is provided on third component 26. The third mating surface 36 of third component 26 faces and mates with a corresponding surface of component 24. Finally, a fourth mating surface 38 is provided on fourth component 28. The fourth mating surface 38 faces and mates with a corresponding surface of third component 26.

Runout refers to eccentric (radial runout) or non-perpendicular (face runout or axial runout conditions that exist between the individual components 22, 24, 26, and 28 of rotor assembly 12. Thus, runout results from shaft misalignment, such shaft misalignment being a deviation of a surface of a shaft component from an axis of rotation or a plurality of collinear axes of rotation.

As each of the mating surfaces 32, 34, 36, and 38 is machined to be flat, the angular misalignment of these surfaces is consistent. Each of the mating surfaces 32, 34, 36, and 38 is machined in a manner to produce a flat surface. The flat mating surfaces 32, 34, 36, and 38 produced by this machining are often not parallel with respect to a horizontal axis X that extends perpendicular to the axis of rotation A, which results in axial runout.

Figure 2:
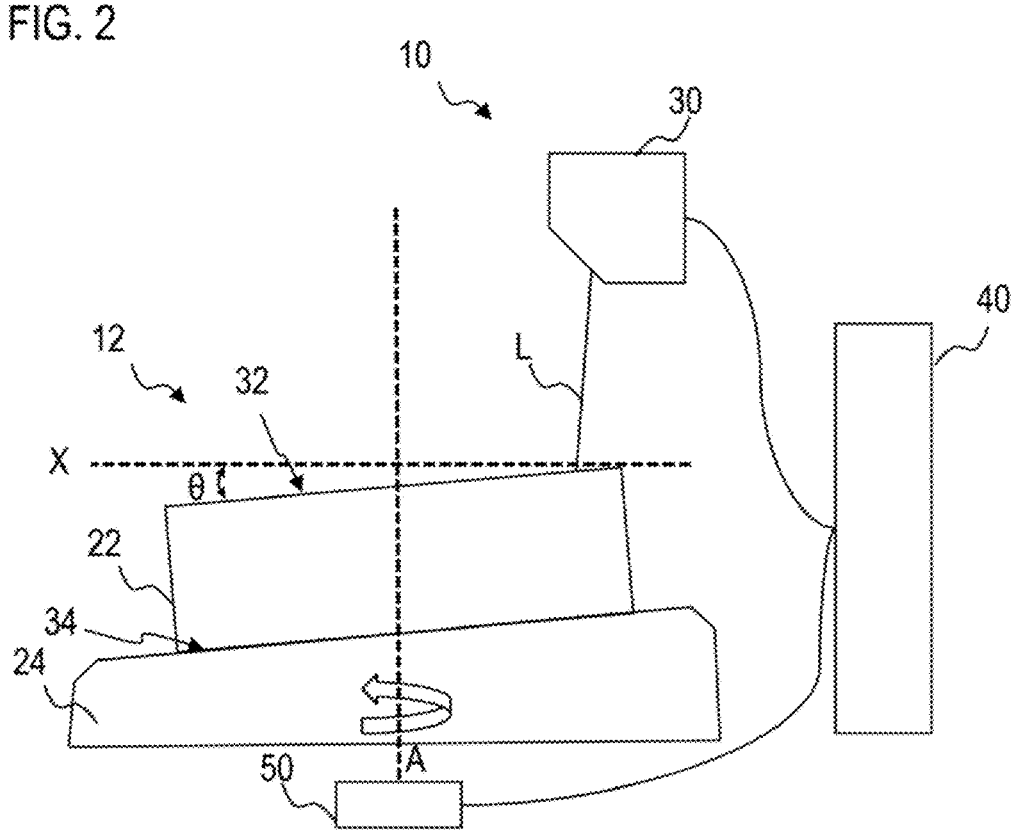
FIG. 2 is a schematic view of a rotor assembly and testing apparatus according to an embodiment of the present invention.

FIG. 2 illustrates a testing apparatus 10 for identifying and minimizing runout. Testing apparatus is configured to identify and compensate for the misalignment between the mating surfaces 32, 34, 36, and 38 to achieve a proscribed axial or radial runout that minimizes this runout. The testing apparatus 10 includes a measurement device 30 and a runout evaluator 40. Measurement device 30 is configured to measure runout of one or more of the components of a rotating assembly, rotor assembly 12. Rotor assembly 12 is a component of a rotating electric machine, for example. Measurement device 30 includes laser sensors such as laser interferometers, or displacement sensors such as a dial gauge. Measurement device 30, as depicted in FIG. 2, can include a laser sensor that projects laser light L to a measurement target. When a displacement sensor is used as measurement device 30, a probe of the measurement device 30 physically contacts the measured surface, instead of laser light L.

As depicted in FIG. 2, first component 22 and second component 24 are coupled together. Third component 26 and fourth component 28 can also be fixed together with first component 22 and second component 24 to provide a measurement of the runout of the combined components of rotor assembly 12 when the rotor assembly 12 is formed by the tour components 22, 24, 26, and 28. As illustrated in FIG. 2, when rotor assembly 12 is formed by two components, 22 and 24, a measurement by measurement device 30 when these two components are fixed together corresponds to the total runout of rotor assembly 12.

Measurement device 30 measures a distance between the measuring device 30 and a mating surface. As each mating surface 32, 34, 36, 38 is a flat surface, some inclination with respect to horizontal axis X is present. In the example illustrated in FIG. 2, mating surface 32 is inclined with respect to horizontal axis X by angle θ when first component 22 and second component 24 are fixed together. For ease of illustration this angle θ is exaggerated in FIG. 2. By measuring a distance between measurement device 30 and the axial end surface formed by mating surface 32, measurement device 30 is able to characterize the axial runout of first component 22 and each component fixedly attached thereto, such as second component 24. Axial runout of the mating surface is quantified by rotating the mating surface about the axis of rotation A for at least one full (360 degrees) rotation while measuring the distance between the measurement device 30 and the mating surface at a constant radial position. Measurement device 30 can also measure a distance from an outer circumferential surface of each of the components of rotor assembly 12. Thus, by directing measurement device 30 to measure a distance in a direction orthogonal to vertical rotational axis A, measurement device 30 and runout evaluator 40 can also be employed to characterize radial runout.

Drive unit 50 is a servo motor, for example, which is driven to rotate one or more of the components during the measurement by measurement device 30. Drive unit 50 can be controlled via runout evaluator 40, or by an independent controller. When drive unit 50 is connected to runout evaluator 40, drive unit 50 can provide position feedback to runout evaluator 40 while runout evaluator outputs instructions to cause drive unit 50 to rotate at a constant velocity.

By taking repeated measurements in accordance with the data sampling rate while the mating surface is rotated at constant velocity by drive unit 50, a sinusoidal waveform is obtained. During the measurement, measurement device 30 outputs a signal indicating the measured distance to runout evaluator 40, thus providing a signal from which evaluator 40 produces a sinusoidal waveform.

Figure 3:
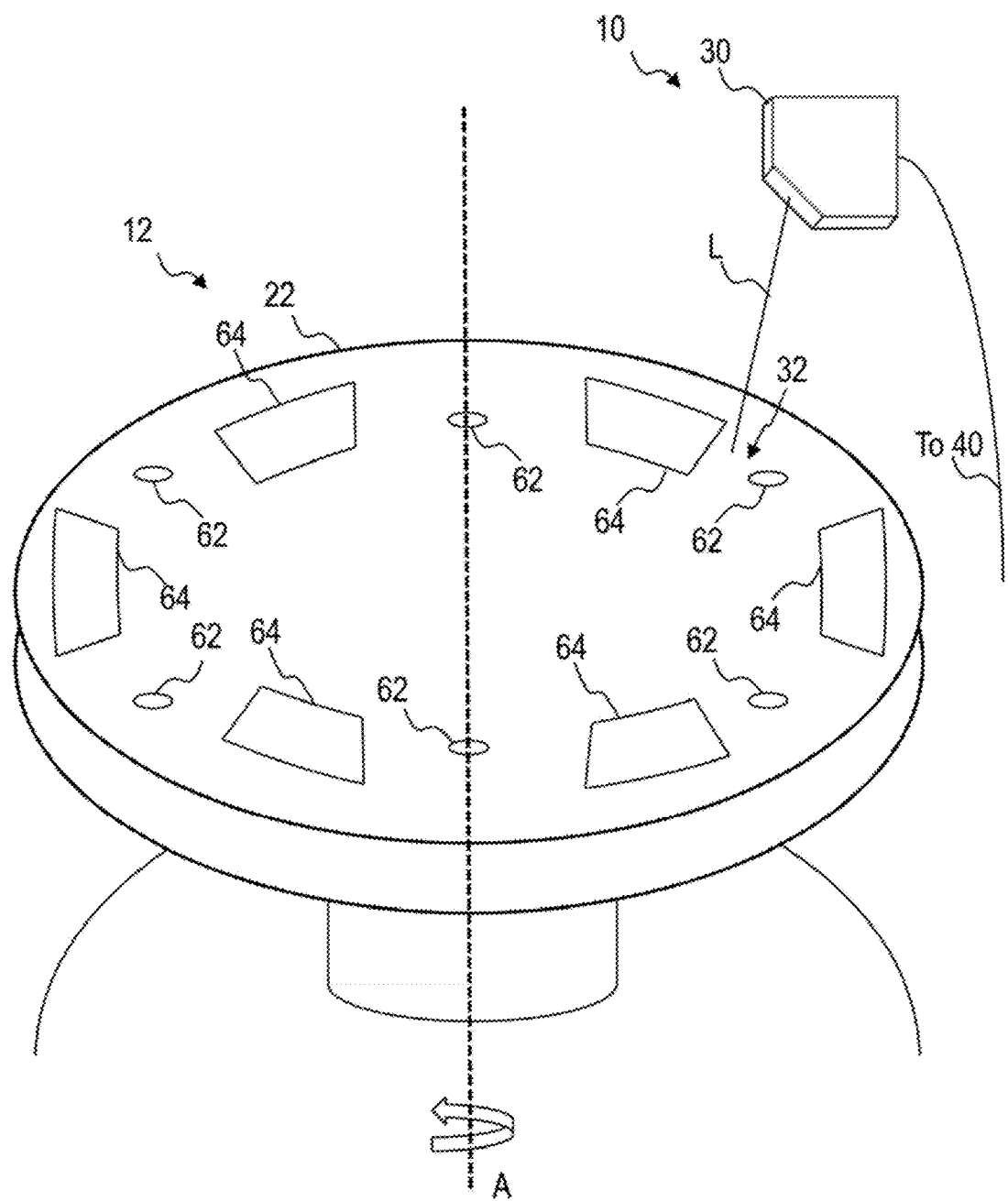
FIG. 3 is a partially-schematic perspective view of the rotor assembly and testing apparatus according to an embodiment of the present invention.

FIG. 3 provides a perspective view of testing apparatus 10 while measurement data is obtained by measurement device 30. As illustrated in FIG. 3, first component 22 is rotated about vertical axis A by drive unit 50 while measurement device 30 measures a distance from a point on mating surface 32. In the example illustrated in FIG. 3, first component 22 includes six counterbores or fastener holes 62 which each receive a fastener such as a bolt. Other surface features 64 can also be present on mating surface 32. Physical features such as surface features 64 can be employed to establish a known zero position for the surface. For example, one of the surface features 64, or a other physical feature of mating surface 32, is used to establish a zero position from which the measurement device 30 begins measurement. Once mating surface 12 has rotated one full rotation of 360 degrees, the zero position and corresponding physical feature is measured again by measurement device 30. This allows the data obtained via measurement device 30 to be correlated to each circumferential position of mating surface 32. Similarly, the position of each of the fastener holes 62 is thereby registered by runout evaluator 40 in relation to the data obtained by measurement device 30. While surface features 64 such as depressed or raised areas are illustrated in FIG. 3, other types of physical features, including temporary features, can be employed to establish a zero position.

Figure 4:
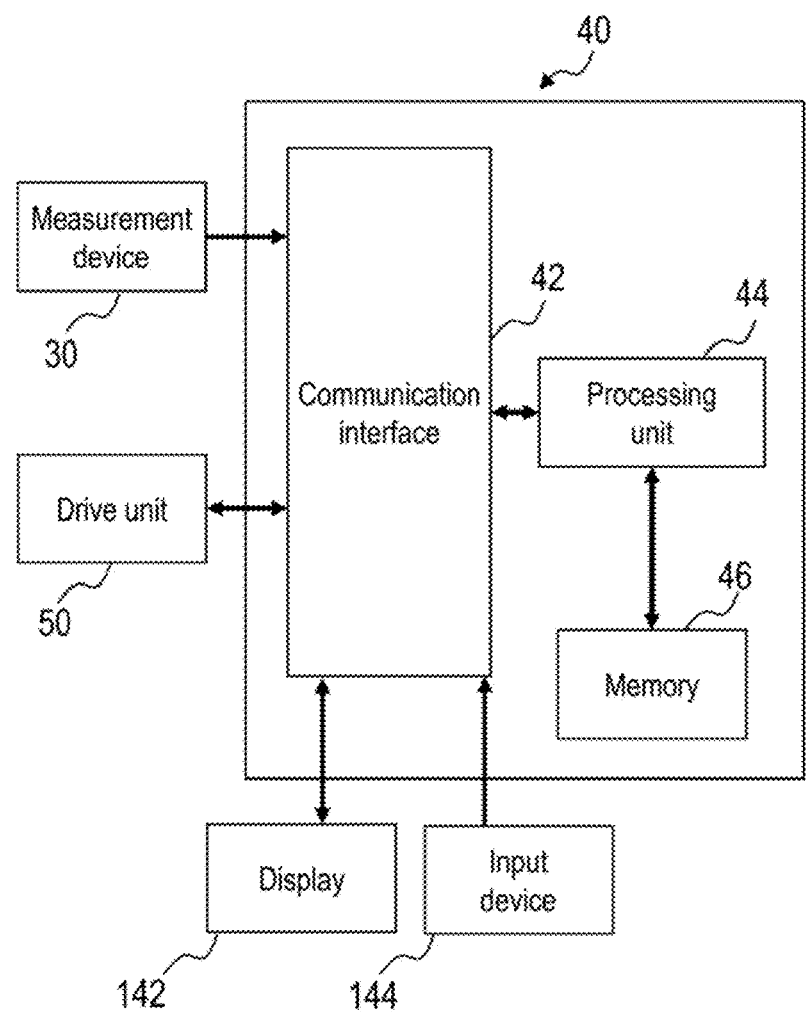
FIG. 4 is a block diagram illustrating a configuration of the testing apparatus according to an embodiment of the present invention.

FIG. 4 depicts an exemplary configuration of testing apparatus 10, which includes measurement device 30 and runout evaluator 40. Runout evaluator 40 includes a communication interface 42, a display 142, an input device 144, a processing unit 44, and a memory device 46. As depicted in FIGS. 2 and 3, runout evaluator 40 is in communication with measurement device 30 and drive unit 50 via communication interface 42. Communication interface 42 is, for example, one or more I/O devices and can include wired communication as well as wireless communication between runout evaluator 40, measurement device 30, drive unit 50, display 142, and input device 144. For example, when measurement device 30 is not directly connected to runout evaluator 40, measurement device 30 can perform a measurement and sure the measurement on a storage device. Subsequently, this storage device can be provided to runout evaluator 40, allowing greater freedom in operating testing apparatus 10.

Processing unit 44 is at least one processor or CPU which can execute a program stored in memory 48 and thereby allow runout evaluator 40 to receive data from measurement device 30, display information via display 142. Memory device 46 is, for example, a hard disk drive, a solid state storage device, an EEPROM, or another non-transitory storage medium capable of long-term storage. Memory device 46 can additionally include random access memory (RAM) or other memory types to assist in processing and storing data from measurement device 30.

Memory device 46 is for example a computer readable medium that stores a software program containing instructions that allow runout evaluator 40 to receive data from measurement device 30, process this data from measurement device 30, and calculate one or more mating positions in order to minimize runout in rotor assembly 12. Thus, the computer readable medium exemplified by memory 46 includes instructions that cause a computer to function as the runout evaluator 40, including each of the associated functions described herein, thereby performing runout determination and minimization.

Input device 144 of runout evaluator 40 allows a user to input information to runout evaluator 40, as well as request the display of data from measurement device 30 via display 142 or instruct runout evaluator 40 to perform a calculation to minimize runout of a rotor assembly 12. Input device 144 can include a keyboard, mouse, touch interface, or other interface for runout evaluator 40.

Runout evaluator 40, including display 142, input device 144, communication interface 42, processing unit 44, and memory 46 is an example of circuitry for performing the functions described herein for minimizing runout.

Figure 5A:
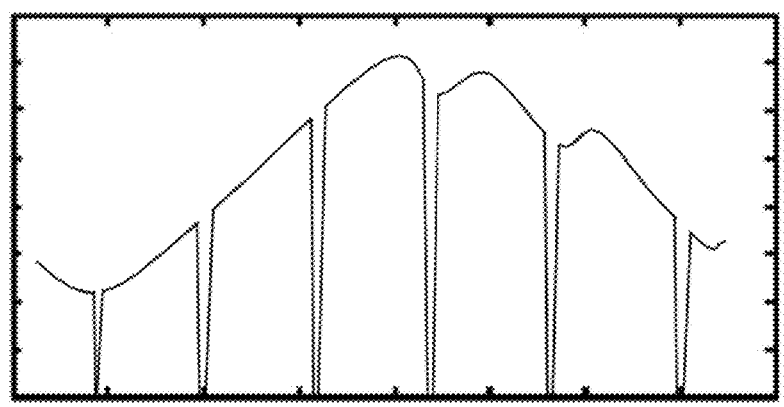
FIGS. 5a and 5b are charts depicting exemplary sinusoidal waveforms generated by a measurement device according to an embodiment of the present invention.
Figure 5B:
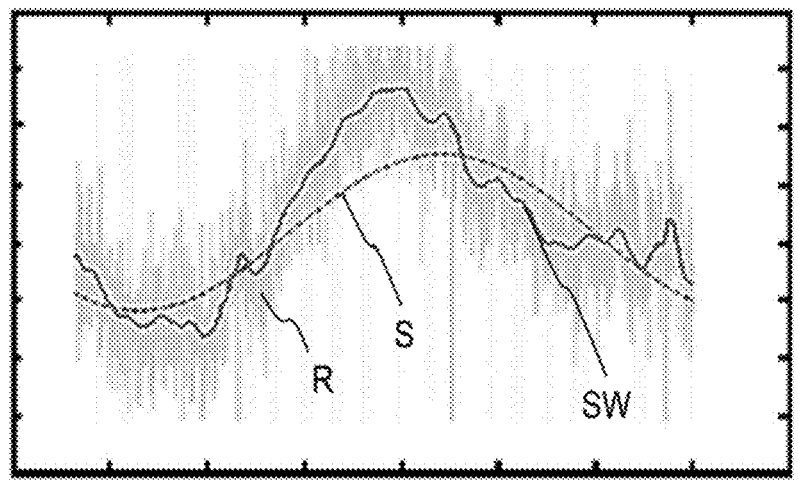

FIGS. 5a and 5b depict exemplary substantially sinusoidal waveforms obtained from measurement data generated by measurement device 30. Mating surfaces 32, 34, 36, and 38 produce substantially sinusoidal or nearly sinusoidal waveforms when measured by measurement device 30, as each surface is machined flat and rotated for one full rotation of 360 degrees about axis A while measurement device 30 measures the distance between the measurement device 30 and the mating surface. These waveforms are the result of periodic deviations of the flat mating surface 32, 34, 36, or 38 with respect to axis X, which is perpendicular to rotational axis A, as depicted in FIG. 2.

In FIGS. 5a and 5b, the horizontal axis represents the circumferential position of the measured surface, while the vertical axis corresponds to the distance between measurement device 30 and the measured surface. Thus, runout is represented by the deviation in the positive and negative vertical directions with respect to a center of the sinusoidal waveform in the vertical direction. The measured mating surface will exhibit nearly sinusoidal runout with a period equal to one shaft rotation, 360 degrees of rotation about axis A. As also illustrated in FIGS. 5a and 5b, noise and discontinuities can be present in the signal output from measurement device 30. For example, six discontinuities appear in the substantially sinusoidal waveform in FIG. 5a. These discontinuities are each caused by a respective counterbore (e.g. fastener holes 62) in mating surface 32, for example. The fastener holes 62 in mating surface 32 of first component 22 each receive a bolt for fastening the first component 22 to the remaining components of rotor assembly 12.

In addition to discontinuities, the substantially sinusoidal waveform generated from the raw data R output from measurement device 30 can include noise, as illustrated in FIG. 5b. In order to prevent discontinuities and noise in raw data R from affecting the reduction in runout, the sinusoidal waveform obtained from measurement device 30 can be filtered (e.g. by omitting outlying data points that are larger than or smaller than a corresponding value), or otherwise manipulated by runout evaluator 40 to obtain a substantially sinusoidal waveform SW that better confirms to a sinusoidal shape. As illustrated in FIG. 5b, a least squares approximation, for example, can be employed to obtain substantially sinusoidal waveform SW that more closely fits the measurement from measurement device 30. The magnitude (or amplitude) and phase of the substantially sinusoidal waveform SW can be used to obtain sinusoid S. Obtaining a sinusoid S with a single period allows for the determination of a quantified magnitude and phase of the sinusoid. The magnitude, or the largest deviation of the sinusoid from the center of the sinusoid in the vertical direction, corresponds to the greatest or smallest distance measured by measurement device 30 during a single rotation about axis A. The phase of sinusoid S corresponds to the location of the sinusoid where the magnitude exists. Thus, the phase is useful as an indicator oldie circumferential position of the mating surface 32, 34, 36, 38 at which the largest or smallest distance is measured.

The sinusoidal waveforms referred to as substantially sinusoidal waveforms or nearly sinusoidal waveforms as these waveforms do not fully conform to an ideal sinusoid. This is due to the presence of discontinuities, depressions or raised surfaces, or noise. Thus, a substantially sinusoidal waveform or nearly sinusoidal waveform is a waveform to which an ideal sinusoid can be fit, the resulting sinusoid having a corresponding magnitude and phase.

The sinusoidal waveform obtained by runout evaluator 40 from measurement device 30 can vary according to the radial distance between the center of the surface being tested and the position measured by the measurement device 30. Thus, it is desirable to compensate for any changes in this radial distance. This can be accomplished by the use of a weighting factor for example.

Figure 6A:
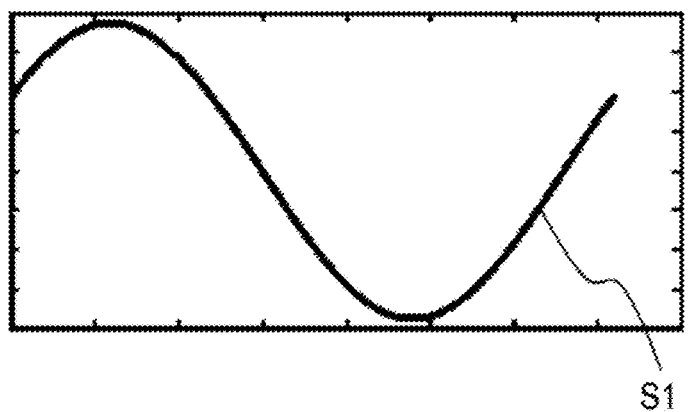
FIGS. 6a-6c are charts depicting exemplary sinusoids according to an embodiment of the present invention.
Figure 6B:
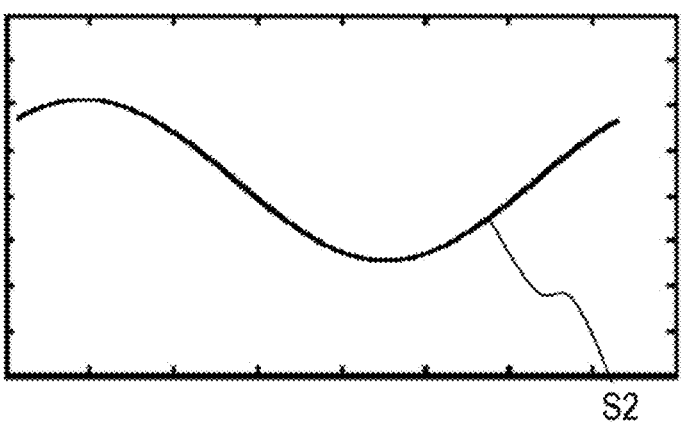
Figure 6C:
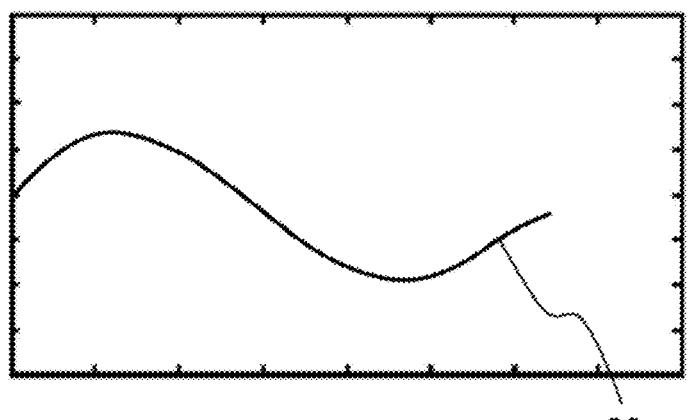

In FIGS. 6a-6c, the horizontal axis represents the circumferential position of the measured surface, while the vertical axis represents runout, corresponding to the distance between measurement device 30 and a mating surface. FIG. 6a represents an exemplary sinusoid S1 obtained by fitting a sinusoid to the sinusoidal waveform obtained from measurement device 30. Thus, the sinusoid S1 of FIG. 6a is obtained by filtering, applying a least squares approximation, or performing other processing on the raw data from measurement device 30. Runout evaluator 40 also determines a magnitude and phase of sinusoid S1. Sinusoid S1 represents a measurement of mating surface 32 of first component 22, while second component 24 is fixed thereto, after a least squares approximation of the raw data, for example. Thus, sinusoid S1 is an example of total runout obtained or calculated by runout evaluator 40. Sinusoid S1 is also an example of an obtained car calculated first runout of a mating surface of a rotating assembly.

In order to correlate the sinusoid of FIG. 6a to the position of first component 22, a physical feature can be identified on first component 22. This physical feature can be identified to establish a zero position of mating surface 32. As discussed previously, the zero position can be established by surface features 64, for example. During the measurement by measurement device 30, the first component 22 is rotated at a constant velocity, which correlates to the data sampling rate. Furthermore, an encoder can provide the position of the first component 22 during rotation. Drive unit 50 can also provide position feedback to runout evaluator 40 via communication interface 42, as illustrated in FIG. 4. Thus, each point the sinusoid S1 corresponds to a known circumferential position of first component 22. The location of each fastener hole 62 is therefore correlated to the corresponding locations of sinusoid S1.

As described above, FIG. 6a depicts a first exemplary sinusoid S1 that corresponds to axial runout when first component 22 and second component 24 are joined. Sinusoid S1 is a sinusoid that has been fit to the sinusoidal waveform resulting from operation of measurement device 30. A second exemplary sinusoid S2 is then generated in the same manner, as depicted in FIG. 5b. The second sinusoid S2 depicted in FIG. 6b is obtained by first removing first component 22 from second component 24. Second mating surface 34 of second component 24 is then measured by measurement device 30, and the resulting raw data, which is a substantially sinusoidal waveform, is processed in the same manner as the raw data corresponding to the sinusoid of FIG. 6a, thereby fitting a sinusoid S2 to the sinusoidal waveform produced by measurement device 30, and determining a magnitude and a phase of sinusoid S2. Thus, the exemplary sinusoid S2 of FIG. 6b, which results from such processing, exhibits a magnitude that corresponds to the maximum or minimum distance measured by measurement device 30 during a single rotation about axis A, and a phase that indicates the circumferential position of the mating surface 34 at which this maximum or minimum distance is measured. Furthermore, the location of each fastener hole 62 is correlated to the corresponding location of sinusoid S2. Sinusoid S2 is an example of a second runout of a mating surface of a rotor assembly obtained or calculated by runout evaluator 40.

Thus, two sinusoids S1 and S2 are generated by runout evaluator 40. The first sinusoid S1, as depicted in FIG. 6a, corresponds to the measurement of mating surface 32 when first component 22 and second component 24 are joined together. The second sinusoid S2, depicted in FIG. 6b, is obtained by measuring second mating surface 34 of second component 24 when first component 22 is removed.

The difference between sinusoid S1 and sinusoid S2 results from the contribution of the first component 22 to the runout represented in sinusoid S1. Thus, the contribution of the first component 22 can be characterized by a third sinusoid S3 which is calculated by the runout evaluator 40 by subtraction of the second sinusoid S2 from first sinusoid S1. Runout evaluator 40 also determines the magnitude and phase of sinusoid S3.

Once runout evaluator 40 has calculated total runout (sinusoid S1), a runout contribution of a second component 24 (sinusoid S2), and a runout contribution of a first component 22 (sinusoid S3, which can be determined by S1-S2), runout evaluator 40 can determine an assembly of the first component 22 to the second component 24 that achieves the lowest possible runout. Runout calculator 40 can determine a fastener position of first component 22 relative to second component 24 that minimizes runout by a sinusoid comparison process or a vector analysis process, each of which is described below. As depicted in FIG. 3, there is a quantity N1 of fastener holes 62. N1 is equal to six as six fastener holes 62 are present, as depicted in FIG. 3. The sinusoid comparison process and the vector analysis process are performed by runout evaluator 40 to determine how to fasten the components of rotor assembly 12 together with the fastener holes 62 and achieve the smallest possible runout.

Figure 7A:
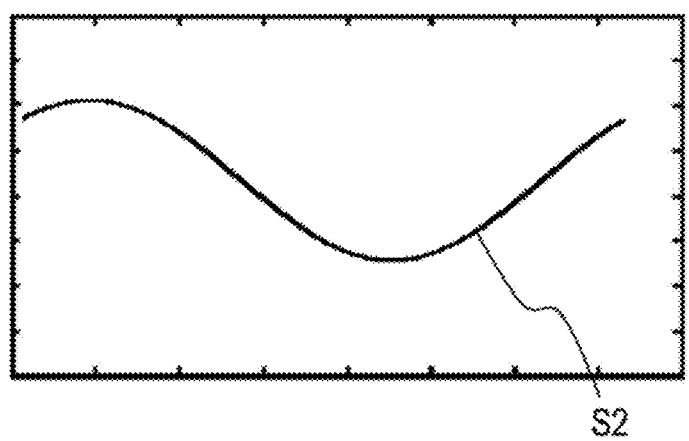
FIGS. 7a and 7b are charts depicting exemplary sinusoids employed in a sinusoid comparison process according to an embodiment of the present invention.
Figure 7B:
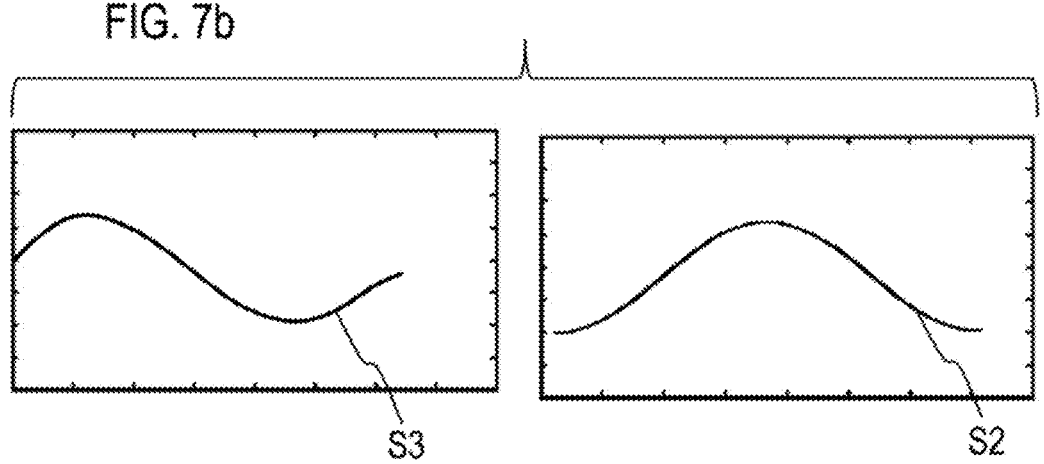

First, a sinusoid comparison process will be described with respect to FIGS. 7a-8. Each fastener hole 62 extends through first component 22 and receives a fastener such as a bolt that extends through first component 22 and extends through a corresponding fastener hole in second component 24. In the example described herein, first component 22 has six fastener holes 62 (N1=6), while second component 24 also includes six corresponding fastener holes 62. Thus, there are six possible fixation positions of first component 22 relative to second component 24, each fixation position providing a different circumferential relationship, or orientation, between these two components. Each fixation position is offset by 360/N1 (in this example 6/360=60 degrees). In an example where rotor assembly 12 includes only first component 22 and second component 24, the entire rotor assembly 12 has six possible assembly combinations. Therefore, runout evaluator 40 evaluates the resulting runout with respect to six different fixation positions in degree increments of 60 degrees each based on sinusoids S1, S2 and S3.

As illustrated in FIG. 6b and FIG. 6c, the runout contribution of the second component 24 (sinusoid S2) and the runout contribution of the first component 22 (sinusoid S3), are readily calculated or determined by runout evaluator 40 in the manner described above. Also, runout evaluator 40 correlates each of the fastener holes 62 with particular circumferential positions of the respective mating surface. Thus, runout evaluator 40 correlates each sinusoid with the corresponding fastener holes 62, allowing runout evaluator 40 to evaluate each possible circumferential position of first component 22 relative to second component 24, when these components are fixed together. As each component includes six fastener holes 62 in this example, six possible sinusoid combinations exist which the first and second component are circumferentially shifted in increments of 60 degrees.

Subsequently, runout evaluator 40 determines the position of first component 22 relative to second component 24 in which the runout contributions of each component, as represented by sinusoids S2 (runout contribution of second component 24) and S3 (runout contribution of first component 22), are combined so as to result in the smallest possible runout. Thus, runout evaluator 40 determines which resulting run out has the smallest magnitude. For example, the runout evaluator 40 determines that by shifting second component 24 by four fixation positions (e.g. four positions defined by fastener holes 62), or 240 degrees, sinusoid S2' results, as depicted in the right chart of FIG. 7b. When in this position, sinusoid S2' represents a runout contribution of second component 24 that partially cancels out the runout contribution of first component 24, which is represented by sinusoid S3.

Figure 8:
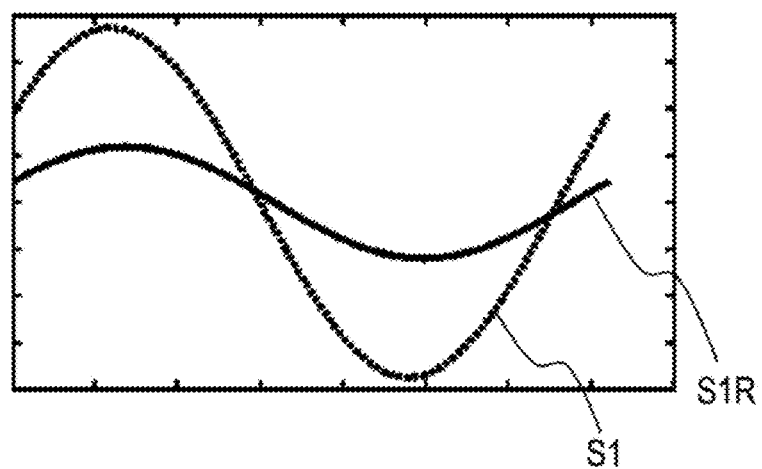
FIG. 8 is a chart illustrating a reduction in runout according to an embodiment of the present invention.

FIG. 8 provides a comparison between the original total runout, represented by sinusoid S1, and the total runout that results when second component 24 is shifted to the fixation position represented by sinusoid S2'. The resulting reduced runout is represented by sinusoid S1R. To achieve this reduced runout, second component 24 is shifted by 240 degrees, or four fixation positions, relative to first component 22. The calculation of total runout can be repeated for each remaining fixation position to determine the minimum possible runout for rotor assembly 12.

As is clear from the foregoing, the possible reduction in runout depends on the magnitude and phase of each individual component's runout contribution, the number of available fixation positions, and the rotational positions of the fastener holes 62. The number of fixation positions, or the number of different rotational positions at which two components can be fixed to each other, determine the number of possible permutations (assembly combinations). Furthermore, as runout evaluator 40 is configured to generate sinusoids for each individual and group of components of the rotor assembly 12, and to correlate the calculated sinusoids to the circumferential position in which fasteners are to be inserted, runout evaluator 40 is configured to determine the minimum possible runout even when a large number of components are used and a large number of fastener holes are present.

Sinusoid S1R of FIG. 8 represents the resulting runout having the minimum possible runout determined by runout evaluator 40 based on sinusoids S1, S2, and S3. This result can be displayed by runout evaluator 40 via display 142, allowing a user to readily identify the fixation position at which the minimum possible runout can be achieved. Display 142 therefore presents information that identifies the fixation position corresponding to the fourth fastener hole 62 from the zero point. When assembly of rotor assembly 12 is performed by an automated process, runout evaluator 40 outputs instructions to an assembly control device via communication interface 42.

A vector analysis process for minimizing runout will now be described with reference to FIGS. 9a-11. As with the example described previously, the vector analysis process will first be described for a rotor assembly 12 having two components 22 and 24.

Figure 9A:
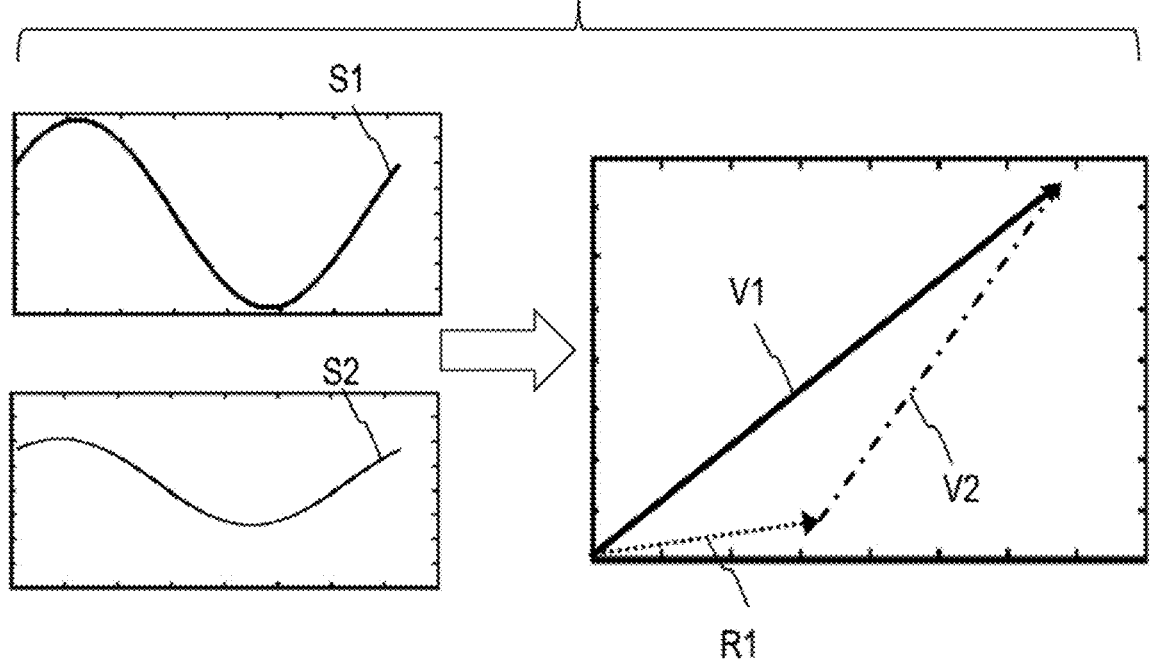
FIGS. 9a-9c are charts depicting exemplary sinusoids and vectors employed in a vector analysis process according to an embodiment of the present invention.

As illustrated in FIG. 9a, first sinusoid S1 and second sinusoid S2 are each analyzed in a vector analysis process. Each sinusoid, and each component's runout contribution, can be viewed as a vector with a magnitude (amplitude) and a phase. As noted above, sinusoid S1 is obtained by fitting a sinusoid to the sinusoidal waveform obtained by measuring mating surface 32 while first component 22 and second component 24 are fixed, thereby representing an axial runout of the entire rotor assembly 12. Sinusoid S2 in FIG. 9a similarly corresponds to the depiction of the sinusoid S2 in FIG. 6b. Sinusoids S1 and S2 can be characterized by equations (1) and (2), which are based on a sinusoidal model equation.

$$S1 = A * e^{(i + \varphi_{S1})} \quad (1)$$

$$S2 = B * e^{(i + \varphi_{S1})} \quad (2)$$

In equation (1), A represents the quantified magnitude of sinusoid S1, while $\varphi_{S1}$ represents a circumferential position of sinusoid S1 having magnitude A. Similarly, B in equation (2) represents the quantified magnitude of sinusoid S2, while $\varphi_{S2}$ represents the circumferential position of sinusoid S2. Each sinusoid can be characterized as a vector having a magnitude (e.g. A) and a phase (e.g. $\varphi_{S1}$). Thus, each sinusoid can be visualized in vector form, as illustrated in the right chart of FIG. 9a. In the vector illustrations in FIGS. 9a-9c, the horizontal axis corresponds to the real component of equations (1) and (2) while the vertical axis corresponds to the imaginary component of equations (1) and (2).

As illustrated in FIG. 9a, vector V1 (solid line) is determined based on the magnitude and phase of sinusoid S1. The length of vector V1 is determined by the corresponding maimitude of sinusoid S1, while the direction of vector V1 is determined by the phase of sinusoid S1. The circumferential position corresponds to the x-axis in the chart containing sinusoid S1. Vector V2 (dot-dash chain line) is a determined based on the magnitude and phase of sinusoid S2. Vector R1 (dotted line) represents the difference between V1 and V2, V1−V2. Therefore, as the difference between V1 and V2, (and the difference between sinusoid S1 and S2) corresponds to the removal of the first component, first component 22. Vector R1 has a magnitude and phase that therefore corresponds to the magnitude and phase of the contribution of first component 22 to the runout, while vector V1 has a magnitude and phase that corresponds to the runout of the rotor assembly 12 when the first component 22 and second component 24 are fixed at a particular fixation position.

Figure 9B:
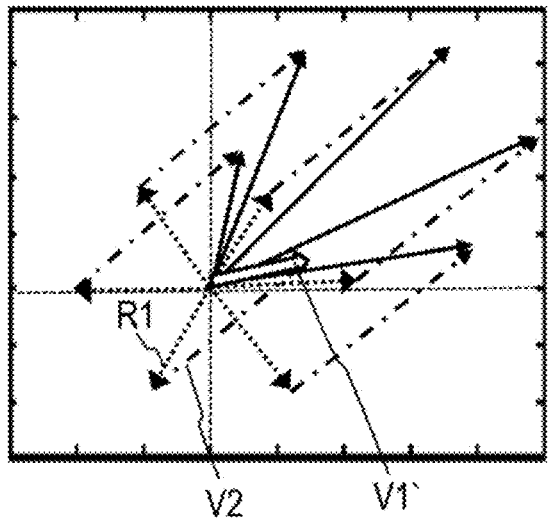

The above-described process is repeated for each fixation position of components 22 and 24, as determined by the positions of fastener holes 62. FIG. 9b is an illustration of vectors corresponding to six circumferential positions at which first component 22 can be fixed to second component 24 via the fastener holes 62. As the first component 22 and the second component 24 are mechanically secured to each other, the relative orientation of the vectors remains constant, as depicted in FIG. 9b. The vectors rotate as a group in accordance with the rotation angle of drive unit 50. FIG. 9b illustrates the magnitude of the runout for each of the six locations at which first component can be fixed to second component 24. Each of the solid lines corresponds to the magnitude and phase of sinusoid S1, and represents a resulting runout when the first component 22 is fixed to the second component 24 at a particular fixation position. The dot-dash lines correspond to the magnitude and phase of sinusoid S2, while the dotted lines each correspond to the magnitude and phase of the contribution of first component 22 to the runout.

As is clear from FIGS. 9a and 9b, vector V1 is equal to the sum of the corresponding vectors R1 and V2. Also, as noted above, vector V1 corresponds to the total axial runout the assembly of first component 22 and second component 24 at one of the six possible fixation positions provided by fastener holes 62. Therefore, runout evaluator 40 proceeds to determine the smallest possible magnitude of vector V1.

FIG. 9b illustrates six potential vectors V1, six potential vectors V2, and six potential vectors R1. The x-axis and y-axis are illustrated by dashed lines in FIG. 9b. These vectors represent the magnitude and phase of the runout of the first component, second component, and total runout when these components are fixed, for each of the possible fixation position. Thus, in the example of FIG. 9b, as illustrated in FIG. 3, six different fixation positions are possible. Runout evaluator 40 determines, from these possible fixation positions, which position results in the runout with the smallest magnitude.

Figure 9C:
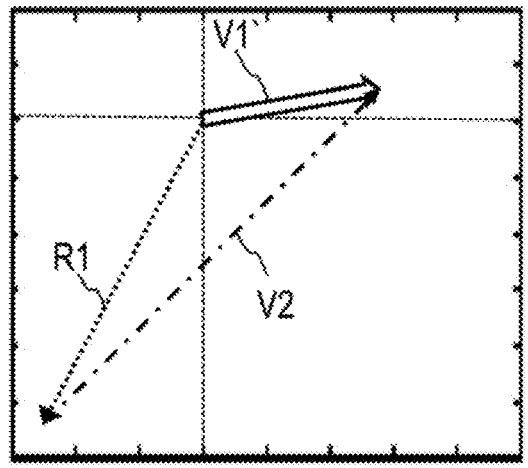

The vector of FIG. 9b having the smallest magnitude, vector V1', is visualized in FIG. 9c. The x-axis and y-axis are illustrated by dashed lines in FIG. 9c. Vector V1 has the shortest length of the six vectors V1, and thereby forms the resulting runout having the minimum possible runout. Vector V1' produces runout for rotor assembly 12 having the same result as depicted in FIG. 8. Thus, the vector analysis process is able to produce the same results as the sinusoidal subtraction process. For ease of illustration, the vectors V1 having magnitudes greater than vector V1' are illustrated as solid lines and are not labeled in FIG. 9b, while vector V1' is emphasized in FIGS. 9b and 9c.

While the vectors illustrated in FIGS. 9a-9c provide a visualization of the vector analysis, runout evaluator 40 is configured to determine the smallest possible vector V1' analytically, using the vector analysis process. This analysis can be represented by equation (3) below:

$$V1' = R_1 e^{\left(\frac{i*j*2\pi}{N_1}\right)} + V2 \quad (3)$$

In equation (3), V1' represents the quantified magnitude of vector V1' at a circumferential position, $R_1$ represents the magnitude of vector R1, j represents the fixation position and $N_1$ is the total number of fixation positions (e.g. six when six fastener holes 62 are present), and V2 is the magnitude of vector V2. The characters π, e, and i correspond to the respective mathematical constants typically associated with these characters.

Once the smallest possible runout is determined by runout evaluator 40 by the sinusoid comparison process or the vector analysis process, the fixation position corresponding to the smallest possible runout can be displayed to a user via display 142, allowing the user to readily understand which position first component 22 is to be fastened to second component 24 to achieve the smallest possible runout. However, when assembly of rotor assembly 12 is performed by an automated process, runout evaluator 40 can output instructions to an assembly control device via communication interface 42 to assemble rotor assembly 12 in a manner that achieves the smallest possible runout.

In the preceding examples, the ability of testing apparatus 10 to determine and minimize runout was described for a rotor assembly 12 including two components. However, testing apparatus 10 and runout evaluator 40 are also configured to employ the sinusoid comparison process or the vector analysis process when a larger number of components are present. The identification and minimization of runout for an exemplary rotor assembly 12 having four components will be described below.

When third component 26 with N2 fastener holes 62 is to be assembled in rotor assembly 12, more potential assembly combinations are possible. In a rotor assembly 12 having first component 22, second component 24, and third component 26, with N1=6 and N2=6, there would be six different fixation positions between first component 22 and second component 24, and six different fixation positions between second component 24 and third component 26. Therefore, thirty-six different assembly combinations would exist. Thus, as the number of components and corresponding number of fastener holes increases, the number of potential assembly combinations for the respective components rapidly increase.

Figure 10A:
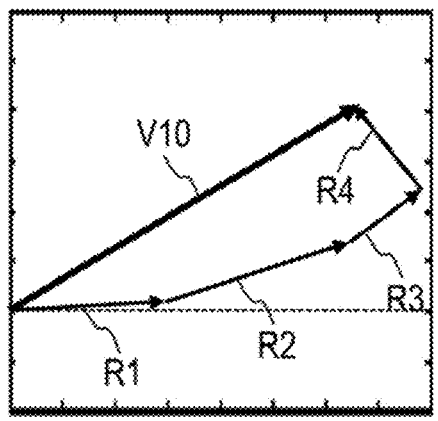
FIGS. 10a and 10b are charts illustrating exemplary vectors employed in the vector analysis process according to an embodiment of the present invention.
Figure 10B:
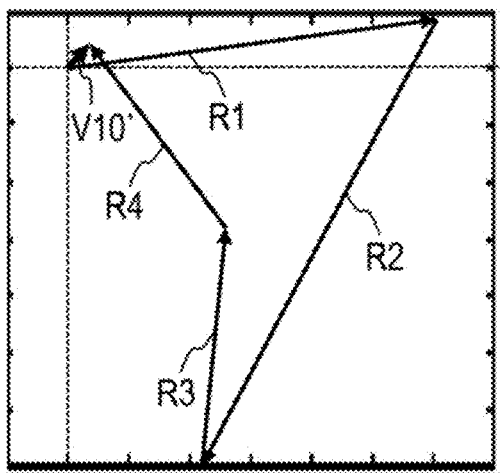
Figure 11:
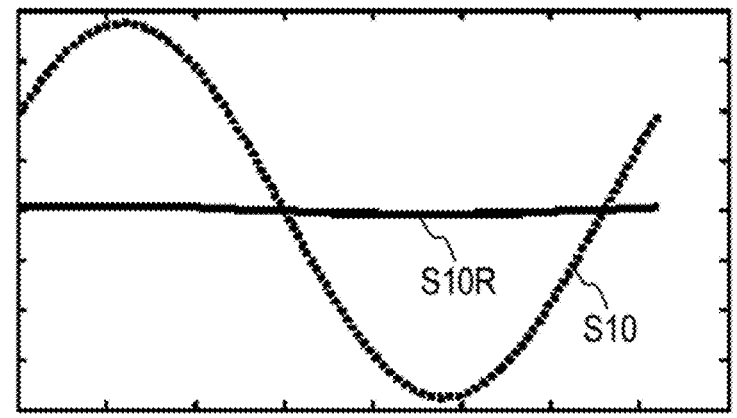
FIG. 11 is a chart illustrating a reduction in runout according to an embodiment of the present invention.

FIGS. 10a, 10b, and 11 illustrate a vector analysis process for rotor assembly 12 having four components. Corresponding to the illustration of rotor assembly 12 in FIG. 1, runout evaluator 40 is configured to determine a minimum possible runout when four components are present: first component 22, second component 24, third component 26, and fourth component 28. These, components each include a respective flat mating surface 32, 34, 36, and 38, as discussed above with respect to FIG. 1.

First, each mating surface 32, 34, 36, 38 of the components 22, 24, 26, and 28 of rotor assembly 12 are sequentially measured with measurement device 30 of testing apparatus to obtain a series of sinusoidal waveforms. For example, mating surface 32 (a surface of a first member) is measured by measurement device 30 while all four components 22, 24, 26, and 28 of rotor assembly 12 are fixed to each other. Subsequently, first component, shaft 22, is removed and mating surface 34 (a surface of a second member) is measured with measurement device 30 while second component 24, third component 26, and fourth component 28 are fixed to each other. Then, second component 24 is removed and mating surface 36 (a surface of a third member) is measured by measurement device 30, while only third component 26 and fourth component 28 are fixed to each other. Finally, mating surface 38 (a surface of a fourth member) of fourth component 28 is measured by measurement device 30 while no other components are fixed to fourth component 28. Thus, four sinusoidal waveforms are obtained by runout evaluator 40.

Each of the four sinusoidal waveforms is analyzed by runout evaluator 40 to obtain a series of respective sinusoids, for example by fitting a sinusoid to each substantially sinusoidal waveform by a least squares approximation method or by other filtering and analysis. The sinusoids respectively correspond to first, second, third, and fourth runouts obtained from measurement device 30. By obtaining these four sinusoids, runout evaluator 40 can calculate the contribution of each individual component, or each group of components, to the total runout. Specifically, runout valuator 40 can calculate the runout contribution based on the magnitude and phase of the four resulting sinusoids. For example, the runout contribution of component 22 is determined by subtracting the runout contribution obtained by measuring mating surface 34 from the total runout determined when mating surface 32 is measured. Similarly, runout evaluator 40 determines the runout contribution of second component 24 by subtracting the measurement of mating surface 36 from that of mating surface 34. This process is repeated until the runout contribution of each individual component is determined by runout evaluator 40. This can be performed by applying the sinusoid comparison process as well as the vector analysis process.

The runout evaluator 40 can then proceed to compare each sinusoid based on the number and location of fastener holes 62 in each of the components. This comparison can be made according to the sinusoid comparison process or the vector analysis process described above.

FIG. 10a depicts exemplary vectors representing the contribution of each individual component 22, 24, 26, and 28, to the total runout represented by vector V10. In FIG. 10a, the x-axis is represented by a dashed line, while the y axis is located along the left-side of the figure. As can be seen from FIG. 10a, the total runout of rotor assembly 12, as represented by vector V10, can be determined by adding the vectors R1, R2, R3, and R4 which respectively correspond to the runout contribution of first component 22, second component 24, third component 26, and fourth component 28. This relationship can be therefore characterized as V10=R1+R2+R3+R4. Similar to the example in which rotor assembly 12 includes two components are fixed to each other (illustrated in FIG. 9b), it is possible to determine the fixation positions for each of the components 22, 24, 26, and 28 that results in the smallest possible runout.

FIG. 10b depicts exemplary vectors R1-R4 which were determined by runout evaluator 40 as providing the smallest possible runout for a rotor assembly 12 having four components. In FIG. 10b, the x-axis and y-axis are represented by respective dashed lines. In this example, vector V10' represents the minimum possible runout determined by runout evaluator 40. Vector V10' results from the addition of vectors R1-R4. As illustrated in FIG. 10b, the magnitude of vector V10' has been significantly reduced.

The vectors illustrated in FIGS. 10a and 10b provide a visualization of the vector analysis process. Runout evaluator 40 is configured to determine the smallest possible vector V10' analytically, using the vector analysis process. This analysis can be represented by equation (4) below:

$$V10' = R_1 e^{\left(\frac{i*j*2\pi}{N_1}\right)} + R_2 e^{\left(\frac{i*k*2\pi}{N_2}\right)} + R_3 e^{\left(\frac{i*q*2\pi}{N_3}\right)} + R_4 \quad (4)$$

In equation (4), V10' represents the quantified magnitude of vector V10' at a circumferential position, $R_1$, $R_2$, $R_3$, and $R_4$, represents the magnitude of vectors R1, R2, R3, and R4, respectively, represents the fixation position of first component 22 relative to second component 24 and $N_1$ is the total number of fixation positions (e.g. six when six fastener holes 62 are present). Similarly, k represents the fixation position of second component 24 relative to third component 26, $N_2$ is the total number of fixation positions between components 24 and q represents the fixation position of third component 26 relative to fourth component 28, while $N_4$ is the total number of fixation positions between components 26 and 28. The characters $\pi$, e, and i correspond to the respective mathematical constants typically associated with these characters.

The resulting improvement in runout for the rotor assembly 12 is illustrated in FIG. 11. In FIG. 11, sinusoid S10 represents the original runout for the entire rotor assembly 12, while sinusoid S10R depicts the improvement achieved by the aforementioned sinusoid comparison process or the vector analysis process. As is clear from this example, runout evaluator 40 of testing apparatus 10 can significantly reduce the runout of rotor assembly 12 as more components are added due to the number of additional fixation positions available. Similarly, an increase in the number of fastener holes 62 in the components provides a larger number of fixation positions, potentially improving the reduction in runout achievable by runout evaluator 40.

Runout evaluator 40 is further configured to output minimum possible runout and output the fixation positions that result in the minimum possible runout. Runout evaluator 40 is configured to provide detailed information on display 142 to inform an operator with respect to each of the fixation positions. For example, runout evaluator 142 displays information defining the positions for each of the components 22, 24, 26, and 28 which will minimize runout of the rotor assembly 12. During the evaluation of runout, runout evaluator 40 can control display 142 to display the corresponding raw data from measurement device 30, the substantially sinusoidal waveforms corresponding to the runout of one or more of the components 22, 24, 26, and 28, the sinusoids that are fit to the substantially sinusoidal waveforms, the runout contribution of one or more al the components 22, 24, 26, and 28, as determined by runout evaluator 40, each resulting runout, and the smallest resulting runout. This information an also be output via a physical medium, such as a printout, or transmitted by communication interface 42 of runout evaluator 40 to an external device such as an assembly control device or a controller. When assembly of rotor assembly 12 is performed by an automated device, runout evaluator 40 is configured to output instructions to the assembly control device via communication interface 42.

Figure 12:
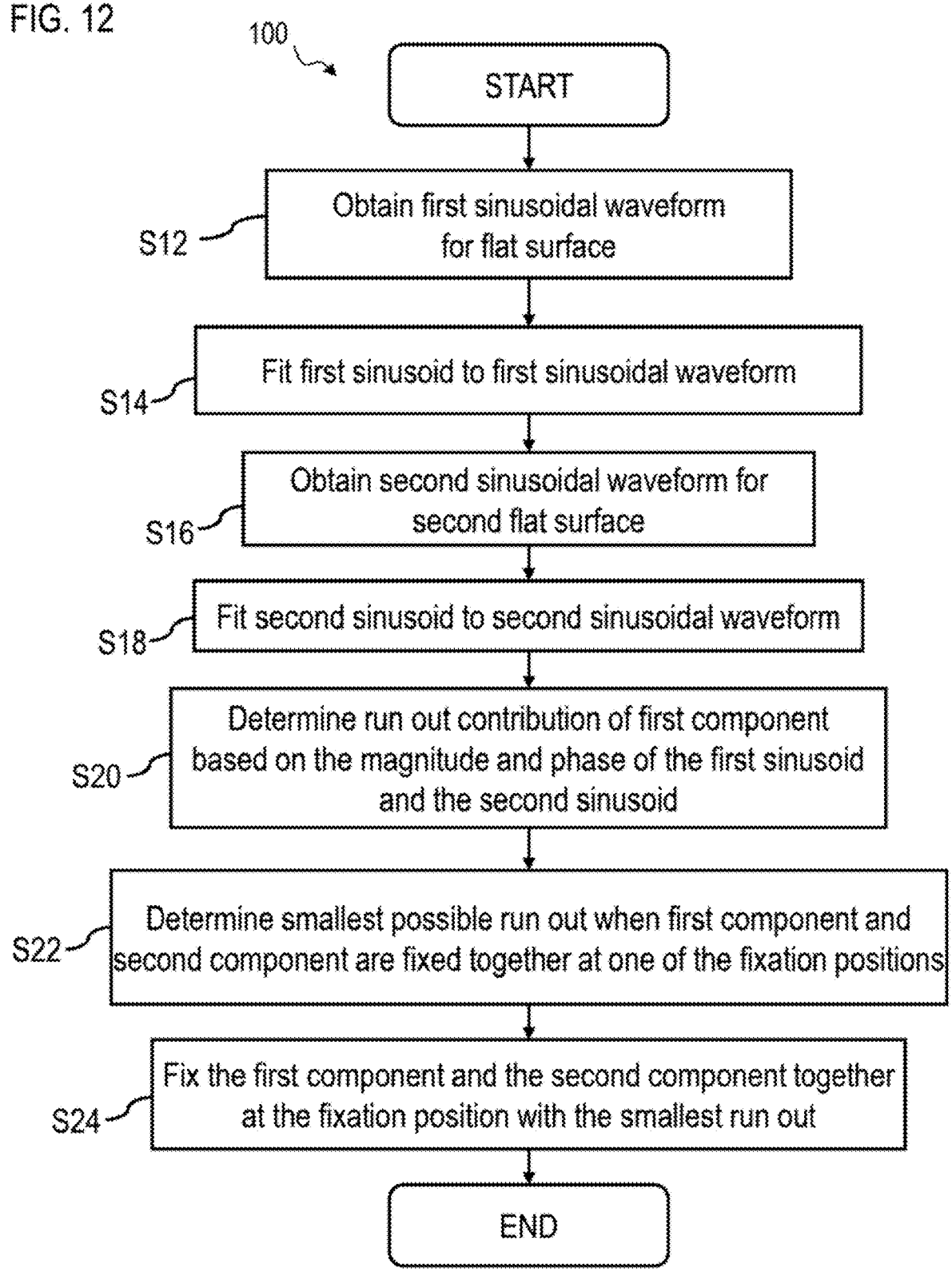
FIG. 12 is a flowchart illustrating an exemplary process for minimizing runout according to an embodiment of the present invention.

A process 100 for reducing runout in rotor assembly 12 with testing apparatus 10 will now be described with reference to FIG. 12. In exemplary process 100, it is assumed that rotor assembly 12 is formed of two components, first component 22, and second component 24. The exemplary process 100 is performed with testing apparatus 10. As is clear from the following, process 100 is effective to minimize the runout of a rotor assembly 12 having first component 22 and second component 24.

First, in step S12, flat mating surface of first component 22 is measured by measurement device 30 of testing apparatus 10 to produce a corresponding first sinusoidal waveform. This is performed in the manner described above, by rotating the rotor assembly 12 about axis A for at least one full rotation while the first component 22 and second component 24 are fixed to each other. During this rotation, measurement device 30 measures a distance to mating surface 32 at a constant radial distance the axis A. The raw data from measurement device 30 is output to runout evaluator 40. The output of raw data can be performed while the measurement is taken or at a time following completion of the measurement. Thus, runout evaluator 40 of testing apparatus 10 obtains the first sinusoidal waveform.

Subsequently, in step S14, runout evaluator 40 fits a sinusoid S1 to the first sinusoidal waveform. As the first sinusoidal waveform is obtained while the first component 22 and second component 24 are fixed to each other, the resulting sinusoid S1 represents that combined runout for these components. The fitting of step S14 can include removing any discontinuities resulting from holes, depressions, or through holes, such as fastener holes 62 and/or surface features 64. A least squares approximation can be applied by runout evaluator 40 to fit a sinusoid to the first sinusoidal waveform.

Next, in step S16, first component 22 is removed from second component 24 and flat mating surface 34 of second component 24 is measured by measurement device 30 in a similar manner as in step S12. Thus, a second sinusoidal waveform representing runout of the second component 24 is obtained by runout evaluator 40.

When the measurement device 30 is positioned at different radial positions during the measurement of the flat mating surfaces 32 and 34, the difference between the positions of these measurements can be compensated by the use of a weighting factor or another appropriate method. Thus, each resulting sinusoidal waveform is scaled to the same measurement radius.

The process 100 then proceeds to step S18. In step S18, a second sinusoid, sinusoid S2, is fit to the second sinusoidal waveform in a manner similar to step S14. This can also be performed by a least squares approximation, for example.

Once the first sinusoid S1 and second sinusoid S2 have been obtained by runout evaluator 40, the process 100 proceeds to step S20. As the total runout when the first component 22 and second component 24 are fixed together is known (sinusoid S1 obtained in step S14), and the contribution of second component 24 is known (sinusoid S2 obtained in step S18), it is possible to determine the contribution of the first component 22 to the total runout in step S20. For example, a sinusoid S3 representing the contribution of first component 22 to the total runout is determined by runout evaluator 40 which calculates the difference between sinusoid S1 and sinusoid S2.

Subsequently, in step S22, runout evaluator 40 determines the smallest possible runout when the first component 22 and the second component 24 are fixed together. This determination is made based on the runout contribution of each component and the location and number of fixation positions, as determined by fastener holes 62, for example. Step S22 can be performed by either the sinusoid comparison process or the vector analysis process described in detail above. Step S22 can also include outputting the smallest possible runout, for example by informing an operator of the fixation position at which runout is minimized. Thus, step S22 can include displaying, on display 142, the fixation position that results in minimized runout.

Finally, in step S24, the first component 22 and the second component 24 are fixed together at the fixation position that results in the smallest possible runout determined by runout evaluator 40 and measurement device 30 of testing apparatus 10. Step S24 can also be performed in an automated fashion by generating and outputting an instruction via runout evaluator 40 and controlling one or more automated robotic arms to fasten the first component 22 to the second component 24 at the fixation position with the smallest runout by fastening bolts through fastener holes 62.

Figure 13:
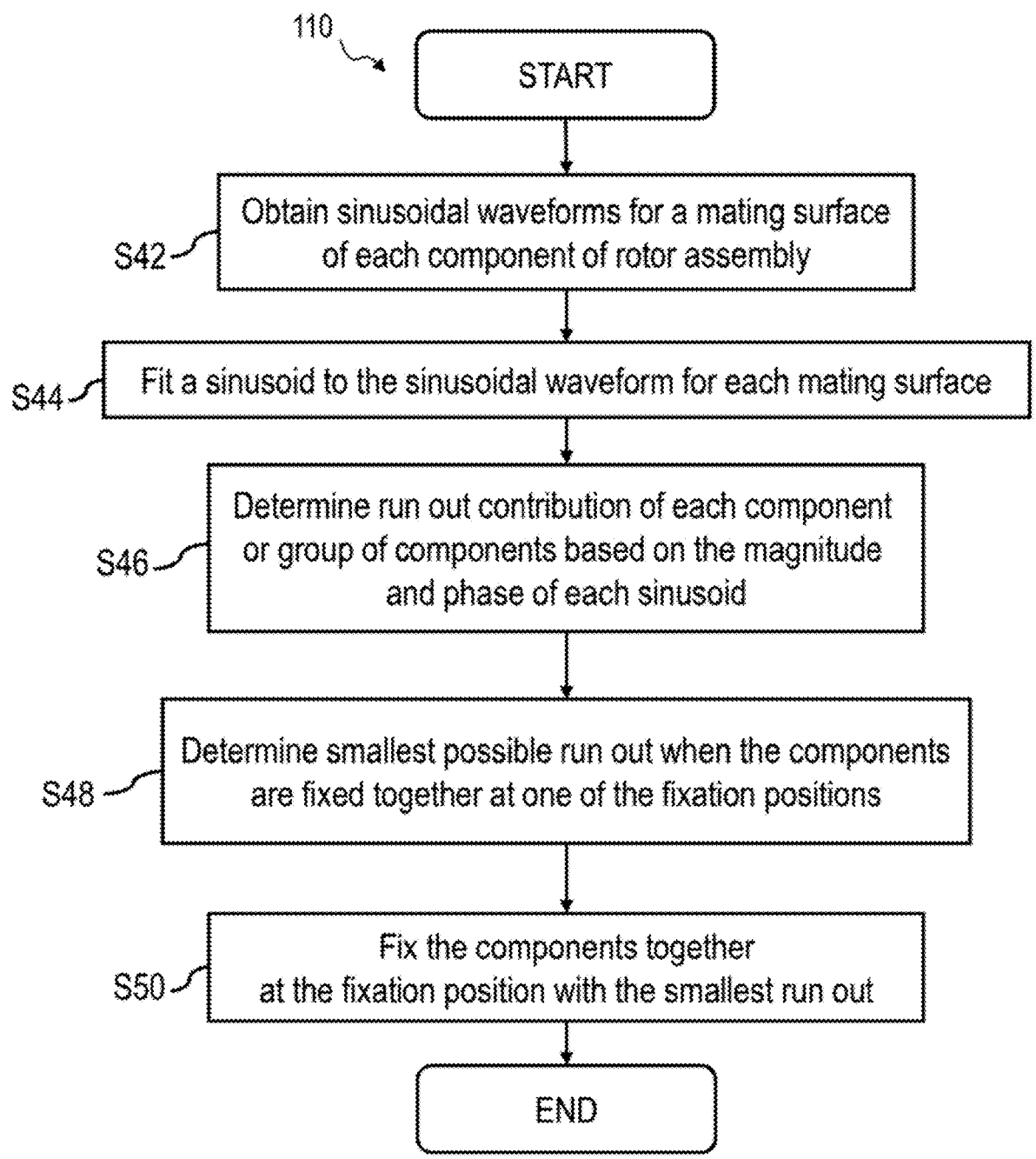
FIG. 13 is a flowchart illustrating an exemplary process for minimizing runout according to an embodiment of the present invention.

A process 110 for runout in a rotor assembly 12 having more than two components will now be described with reference to FIG. 13. In the exemplary process 110, it is presumed that rotor assembly 12 has four components that can be fixed at multiple fixation positions, first component 22, second component 24, third component 26, and fourth component 28, as depicted in FIG. 1. The exemplary process 110 is performed with testing apparatus 10. As is clear from the following, process 110 is effective to minimize the runout of a rotor assembly 12 having more than two components.

First, in step S42, each mating surface 32, 34, 36, and 38, of components 22, 24, 26, and 28 is measured by measurement device 30 to produce a series of sinusoidal waveforms. This can be performed by measuring mating surface 32 is measured by measurement device 30 while all four components 22, 24, 26, and 28 of rotor assembly 12 are fixed to each other, subsequently measuring mating surface 34 with measurement device 30 while second component 24, third component 26, and fourth component 28 are fixed to each other. Then, second component 24 is removed and mating surface 36 is measured while only third component 26 and fourth component 28 are fixed to each other. Finally, mating surface 38 of fourth component 28 is measured while none of the components 22, 24, and 26 are fixed to fourth component 28. Thus, four sinusoidal waveforms are obtained by runout evaluator 40 in step S42.

When the measurement device 30 is positioned at different radial positions during the measurement of any of the flat mating surfaces 32, 34, 36, and 38 the difference between the positions of these measurements can be compensated by the use of a weighting factor or another appropriate method. Thus, each resulting sinusoidal waveform is scaled to the same measurement radius.

Subsequently, in step S44, each of the four sinusoidal waveforms obtained in step S42 are analyzed by runout evaluator 40. Specifically, runout evaluator 40 fits a sinusoid to each sinusoidal waveform, for example by a least squares approximation. Step S44 can include removing any discontinuities resulting from holes, depressions, or through-holes, such as fastener holes 62 and/or surface features 64.

The process 110 then proceeds to step S46, in which the runout contribution of each individual component is determined. Specifically, runout evaluator 40 calculates the runout contribution based on the magnitude and phase of the sinusoids obtained by the fitting of step S44. For example, the runout contribution of component 22 is determined by subtracting the runout contribution obtained when measuring mating surface 34 from the total runout determined when mating surface 32 is measured. Similarly, runout evaluator 40 determines the runout contribution of second component 24 by subtracting the measurement of mating surface 36 from that of mating surface 34. This process is repeated until the runout contribution of each individual component is determined by runout evaluator 40. This can be performed by applying the sinusoid comparison process as well as the vector analysis process.

Following the completion of step S46, runout evaluator 40 determines, in step S48, the combination of fixation positions for each of the components that results in the smallest possible runout. Step S45 can be performed in a manner similar to step S22.

Finally, the process 110 proceeds to step S50. In step S50, each of the components 22, 24, 26, and 28 are fixed together at respective fixation positions that result in the smallest possible runout determined by runout evaluator 40 and measurement device 30 of testing apparatus 10. Step S50 can include displaying, on display 142, the fixation positions that result in minimized runout. Similar to step S24, step S50 can be performed in an automated fashion by generating an instruction via runout evaluator 40 and controlling one or more automated robotic arms to fasten the first component 22, second component 24, third component 26, and fourth component 28 at the respective fixation positions resulting in the smallest runout by fastening bolts through fastener holes 62, for example.

While the above examples describe in detail the use of testing apparatus 10 to evaluate runout and determine fixation positions that minimize the runout of a rotor assembly 12 having two or four components, the above-described processes and testing apparatus 10, including measurement device 30 and runout evaluator 40, are equally useful for assemblies having three components or greater than four components. When an assembly having three components, or more than four components is evaluated, the parallelism, or runout, of each mating surface is characterized and oriented in the manner described herein. It is therefore possible to achieve the minimum possible runout by evaluating all potential fixation positions in a straight-forward manner, and without directly measuring each individual component with the remaining components removed, regardless of the number of components of an assembly.

While the above examples describe the identification and minimization of axial runout in detail, the present invention is also applicable to radial runout.

The testing apparatus, computer readable medium, and methods described herein provide significant advantages. For example, the runout contribution of each component can be determined by runout evaluator 40 without directly measuring each individual component with the remaining components removed. Furthermore, the measurement of one or more of the mating components can be performed off-site, and provided to runout evaluator on a removable medium or over wired or wireless communications. Thus, runout evaluator 40 provides improved convenience when identifying and analyzing runout.

Furthermore, the significant reduction in runout achieved in the manner described herein increases the operating life of the machine as cyclic fatigue is reduced. The components of the machine that are most likely to fail, such as bearings, seals, couplings, and shafts, are more accurately aligned and readily operate within their design specifications. This improved alignment particularly increases the durability of bearings by reducing the axial and radial forces acting on the bearings. Furthermore, shaft bending is reduced at coupling locations of the shaft, including the coupling between the point of power transmission, as well as at end hearings. Internal clearances of the rotor are improved, power consumption is reduced, and vibration levels on bearing housings, machine casings, and the rotor assembly as a whole is reduced.

Furthermore, the present invention allows for expedient reduction in runout without use of a dial indicator or laser at multiple points along the length of a rotor over the course of multiple hours. Still further, the present invention achieves improved reduction in runout while avoiding operator error and the variability of operator skill.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A testing apparatus for minimizing runout of a rotating assembly, comprising:
   a measurement device configured to measure a distance to a surface; and
   at least one processor configured to execute at least one program to
      obtain a first runout of a surface of a first member of the rotating assembly from the measurement device, the first runout having a magnitude and a phase,
      obtain a second runout of a surface of a second member of the rotating assembly from the measurement device, the second runout having a magnitude and a phase, and
      determine a rotational position of the first member relative to the second member which would allow for carrying out a reduction in runout of the rotating assembly based on the magnitude and the phase of the first runout and the magnitude and the phase of the second runout.

2. The testing apparatus according to claim 1,
wherein the at least one processor is configured to obtain the first runout and the second runout based on periodic deviations of the surfaces of the first member and the second member with respect to an axis extending perpendicular to a rotational axis of the rotating assembly, the periodic deviations being obtained from the distance measured by the measurement device.

3. The testing apparatus according to claim 2,
wherein the at least one processor is configured to calculate the magnitude and the phase of the first runout and the magnitude and the phase of the second runout based on substantially sinusoidal waveforms obtained from the measurement device.

4. The testing apparatus according to claim 3,
wherein the at least one processor is configured to fit a first sinusoid to the substantially sinusoidal waveform corresponding to the first runout, and to fit a second sinusoid to the substantially sinusoidal waveform corresponding to the second runout, and
wherein the at least one processor is configured to control a display to display a waveform corresponding to at least one of: one of the substantially sinusoidal waveforms obtained from the measurement device, the first sinusoid, the second sinusoid, the reduced runout, and a runout contribution of the first member or the second member.

5. The testing apparatus according to claim 2,
wherein the second runout corresponds to runout of the second member when the second member is not rotationally coupled to the first member.

6. The testing apparatus according to claim 1,
wherein the measurement device includes a laser sensor or a mechanical sensor.

7. The testing apparatus according to claim 6,
wherein the measurement device is a laser interferometer or a dial gauge.

8. The testing apparatus according to claim 1,
wherein the at least one processor is configured to determine a plurality of resulting runouts, each resulting runout corresponding a respective one of a plurality of fixation positions at which the first member can be coupled to the second member, the resulting runouts determined based on the first runout and the second runout.

9. The testing apparatus according to claim 1,
wherein the at least one processor is configured to determine the rotational position of the first member relative to the second member which results in the reduced runout by a sinusoid comparison process or by a vector analysis process.

10. The testing apparatus according to claim 9,
wherein the at least one processor is configured to determine a third runout based on a difference between the first runout and the second runout, the third runout having a magnitude and a phase that correspond to a runout contribution of the first member or the second member.

11. The testing apparatus according to claim 10,
wherein the magnitude and the phase of the first runout or the magnitude and the phase of the second runout corresponds to a runout contribution of both the first member and the second member.

12. The testing apparatus according to claim 1,
wherein the at least one processor is configured to output the rotational position which results in the reduced runout.

13. The testing apparatus according to claim 1,
wherein the at least one processor is configured to output the rotational position which results in the reduced runout by controlling a display to display the determined rotational position.

14. The testing apparatus according to claim 1,
wherein the at least one processor is configured to obtain a third runout of a surface of a third member of the rotating assembly from the measurement device, the third runout having a magnitude and a phase, and
wherein the at least one processor is configured to determine a rotational position of the second member relative to the third member and the rotational position of the first member relative to the second member that together result in a reduced runout of the rotating assembly based on the magnitude and the phase of the first runout, the magnitude and the phase of the second runout, and the magnitude and the phase of the third runout.

15. The testing apparatus according to claim 14,
wherein the first runout is obtained from a measurement by the measurement device when the first member is coupled to the second member and to the third member.

16. A testing apparatus for minimizing runout of a rotating assembly including a first member and a second member, the testing apparatus comprising:
a measurement device configured to measure a distance to a surface; and
at least one processor configured to execute at least one program to:
obtain a first runout of a surface of the first member of the rotating assembly using distance measurements of the surface of the first member from the measurement device while the first member is fixed to the second member and while the first member and the second member rotate about an axis, the first runout having a magnitude and a phase,
obtain a second runout of a surface of the second member of the rotating assembly using distance measurements of the surface of the second member from the measurement device while the second member rotates about the axis, the second runout having a magnitude and a phase, and
determine a rotational position of the first member relative to the second member which would allow for carrying out a reduction in runout of the rotating assembly based on the magnitude and the phase of the first runout and the magnitude and the phase of the second runout.

17. A computer readable medium storing instructions that, when executed by at least one processor, causes the at least one processor to carry out the steps of:
obtaining a first runout of a surface of a first member of a rotating assembly, the first runout having a magnitude and a phase;
obtaining a second runout of a surface of a second member of the rotating assembly, the second runout having a magnitude and a phase; and
determining a rotational position of the first member relative to the second member which would allow for carrying out a reduction in runout of the rotating assembly based on the magnitude and the phase of the first runout and the magnitude and the phase of the second runout.

18. The computer readable medium according to claim 17,
wherein the obtaining the first runout and the obtaining the second runout are performed based on periodic deviations of the surfaces of the first member and the second member with respect to an axis extending perpendicular to a rotational axis of the rotating assembly, the periodic deviations being obtained from a distance measured by a measurement device.

19. The computer readable medium according to claim 18,
wherein the first runout and the second runout are calculated from respective substantially sinusoidal waveforms obtained from the measurement device.

20. The computer readable medium according to claim 19,
wherein the instructions cause the at least one processor to:
fit a first sinusoid to the substantially sinusoidal waveform corresponding to the first runout, and to fit a second sinusoid to the substantially sinusoidal waveform corresponding to the second runout, and
to control a display to display a waveform corresponding to at least one of: one of the substantially sinusoidal waveforms obtained from the measurement device, the first sinusoid, the second sinusoid, the reduced runout, and a runout contribution of the first member or the second member.

21. The computer readable medium according to claim 18,
wherein the second runout corresponds to runout of the second member when the second member is not rotationally coupled to the first member.

22. The computer readable medium according to claim 17,
wherein the instructions cause the at least one processor to determine a plurality of resulting runouts, each resulting runout corresponding a respective one of a plurality of fixation positions at which the first member can be coupled to the second member, the resulting runouts determined based on the first runout and the second runout.

23. The computer readable medium according to claim 17,
wherein the instructions cause the at least one processor to determine the rotational position of the first member relative to the second member which results in the reduced runout by a sinusoid comparison process or by a vector analysis process.

24. The computer readable medium according to claim 23,
wherein the instructions cause the at least one processor to determine a third runout based on a difference between the first runout and the second runout, the third runout being a runout contribution of the first member or the second member.

25. The computer readable medium according to claim 24,
wherein the magnitude and the phase of the first runout or the magnitude and the phase of the second runout corresponds to a runout contribution of both the first member and the second member.

26. The computer readable medium according to claim 17,
wherein the instructions cause the at least one processor to control a display to display the determined rotational position.

27. A method for minimizing runout of a rotating assembly, the method comprising:

obtaining a first runout of a surface of a first member of the rotating assembly, the first runout having a magnitude and a phase;

obtaining a second runout of a surface of a second member of the rotating assembly, the second runout having a magnitude and a phase;

determining a rotational position of the first member relative to the second member which would allow for carrying out a reduction in the runout of the rotating assembly based on the magnitude and the phase of the first runout and the magnitude and the phase of the second runout when the first rotating member is coupled to the second rotating member at the rotational position.

28. The method according to claim 27, wherein determining the rotational position includes outputting the rotational position of the first member relative to the second member which reduces the runout of the rotating assembly.

29. The method according to claim 27, further comprising:

coupling the first rotating member to the second rotating member at the rotational position of the first member relative to the second member which reduces the runout of the rotating assembly.

30. The method according to claim 27, further comprising:

obtaining a third runout of a surface of a third member of the rotating assembly, the third runout having a magnitude and a phase; and determining a rotational position of the second member relative to the third member and the rotational position of the first member relative to the second member that together result in a reduced runout of the rotating assembly based on the magnitude and the phase of the first runout, the magnitude and the phase of the second runout, and the magnitude and the phase of the third runout.

31. The method according to claim 30, wherein the first runout is obtained from a measurement by the measurement device when the first member is coupled to the second member and to the third member.

* * * * *